Nov. 27, 1956 A. FAURE ET AL 2,772,125
SHOE FOR ENDLESS VEHICLE TRACKS
Filed March 24, 1953

INVENTORS
ANDRÉ FAURE
ANTOINE FAURE
BY
Richardson, David and Norton
their ATTORNEYS

United States Patent Office 2,772,125
Patented Nov. 27, 1956

2,772,125

SHOE FOR ENDLESS VEHICLE TRACKS

André Faure and Antoine Faure, Firminy, France

Application March 24, 1953, Serial No. 344,301

Claims priority, application France April 17, 1952

2 Claims. (Cl. 305—10)

Our invention has for its object a shoe or plate forming an element of an endless track, as provided for numerous and varied applications, such as hoisting machines, automobile tractors, tanks, automobiles and the like.

Said improved shoe has for its particular feature a structure which comprises a single stamped sheet metal member incorporating auxiliary parts stamped integrally therewith, to wit lugs and straps for pivotally connecting the shoes with one another and also two bosses of which one extends longitudinally and the other transversely, the longitudinal boss having a U-shaped cross-section forming a rib producing longitudinal rigidity, providing means for holding the shoe on the sprockets and further serving as a race for the bearing rollers while the transverse boss plays the treble part of a driving tooth or element cooperating with the sprockets, of a reinforcing rib and, through its outer hollow surface, of means adhering to the ground.

The accompanying diagrammatic drawing shows by way of example and in a non-limitative sense an embodiment of our improved endless track shoe. In said drawings.

Figure 1:
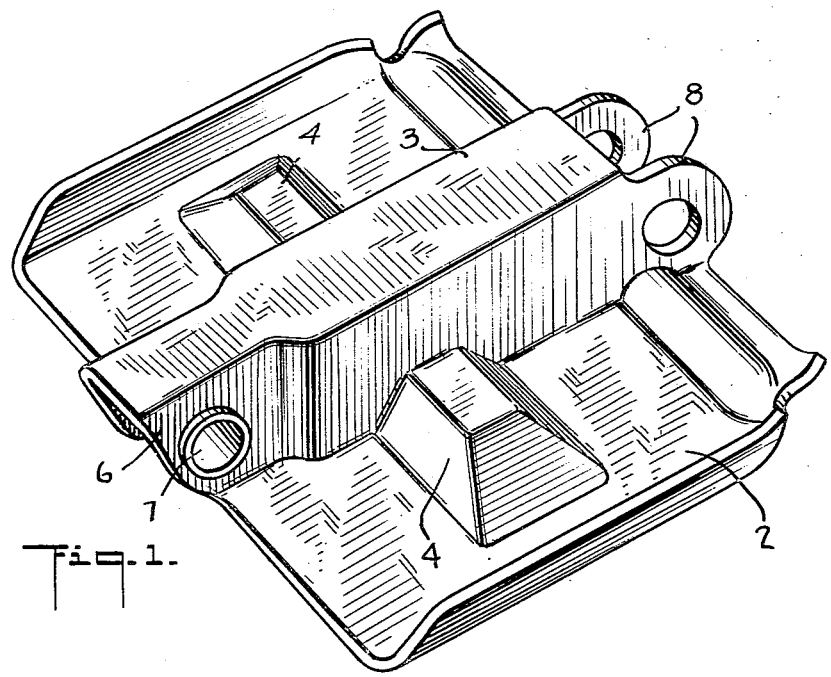
Fig. 1 is a perspective view of the shoe showing its inner surface.
Figure 2:
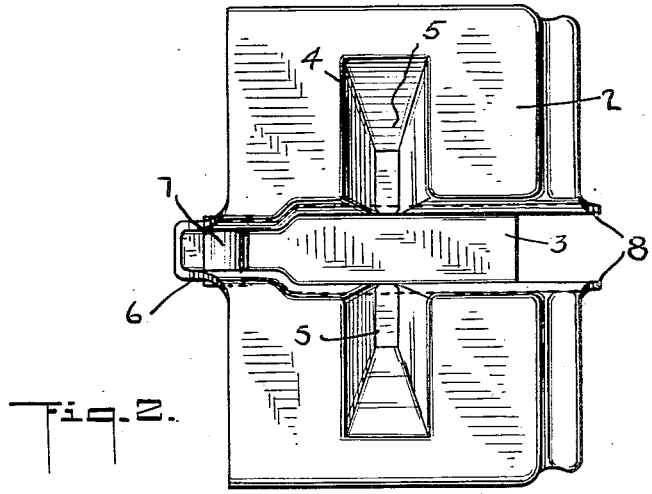
Fig. 2 is a plan view of its outer surface.

Said shoe is constituted by a single part 2 obtained through the stamping of a steel sheet. This stamping allows forming of the following portions at the same time as the main part 2 and integrally therewith:

A longitudinal boss 3 having a U-shaped cross-section and forming a rib providing longitudinal rigidity while it serves as a race for the guide rollers of the endless track and ensures the holding or guiding of the shoe around the sprockets;

A transverse boss 4 extending to either side of said channel 3, said boss 4 plays a treble part: it forms the driving tooth or element for the shoe 2 which cooperates with the teeth of the driving sprocket; it forms a reinforcing rib for the shoe and lastly, through its outer surface, it forms a hollow section or recess 5 extending transversely of the shoe and providing gripping means through which the shoe 2 adheres to the ground;

Lugs 6 formed longitudinally at one of the ends of the shoe 2 and transversely of which is fitted a bushing 7 extending through the space separating the lugs;

A pair of ears 8 extending longitudinally at the other end of the shoe 2 for assembling the latter with the adjacent shoe through a spindle or pin (not shown) passing through the ears 8 of the shoe and through the bushing 7 carried by the lugs 6 of the other shoe.

This shoe, as compared with the usual endless track shoes, offers the chief advantage of having a weight that is much less while its manufacture is much simpler, which leads to a substantially lower cost price.

Obviously, this invention is not limited to the sole embodiment of an endless track shoe which has been disclosed by way of example and it further covers modifications thereof falling within the scope of accompanying claims.

What we claim is:

1. In an endless track for vehicles associated with driving sprockets and bearing rollers, the provision of a plurality of similar directly interconnected unitary plates each consisting of a single one-piece stamped flat sheet metal section, the longitudinal medial part of which is bent into the shape of a narrow U-shaped rib having a smooth outer surface for engagement with the rollers, said rib, opening outwardly of the track, providing longitudinal rigidity for the section, a reinforcing transverse rib being stamped medially across the main section to either side of the rib perpendicularly to the latter to form a recess opening outwardly of the track to engage directly, throughout the length of said transverse rib and to either side of the longitudinal rib, the ground on which the track is to move, the projecting surface of said transverse rib being adapted to operatively engage driving sprockets for said track, and perforated lugs and a pair of ears integral respectively with the medial parts of the opposite transverse edges of said section and merging directly into the corresponding ends of the longitudinal rib, the ears on one flat section being adapted to engage operatively the lugs on the flat section of the adjacent plate.

2. In an endless track for vehicles associated with driving sprockets and bearing rollers, the provision of a plurality of similar directly interconnected unitary plates each consisting of a single one-piece stamped flat sheet metal section, the longitudinal medial part of which is bent into the shape of a narrow U-shaped rib having a smooth outer surface for engagement with the rollers, said rib, opening outwardly of the track, providing longitudinal rigidity for the section, a reinforcing transverse rib being stamped medially across the main section to either side of the rib perpendicularly to the latter to form a recess opening outwardly of the track to engage directly, throughout the length of said transverse rib and to either side of the longitudinal rib, the ground on which the track is to move, the projecting surface of said transverse rib being adapted to operatively engage the sprocket teeth, perforated lugs and a pair of ears integral respectively with the medial parts of the opposite transverse edges of said section and merging directly into the corresponding ends of the longitudinal rib, and means for pivotally securing together the lugs on one flat section with the ears on the flat section of the adjacent plate, the ribs and ears on the different plate sections forming when aligned a continuous guiding surface for the bearing rollers.

References Cited in the file of this patent

UNITED STATES PATENTS

| | | |
|---|---|---|
| 1,330,955 | Savage | Feb. 17, 1920 |
| 1,923,099 | Knox | Aug. 22, 1933 |

FOREIGN PATENTS

| | | |
|---|---|---|
| 631,607 | Germany | June 24, 1936 |